(12) United States Patent
Sadusk et al.

(10) Patent No.: US 9,545,756 B2
(45) Date of Patent: Jan. 17, 2017

(54) PURGE WALL FOR THREE-DIMENSIONAL PRINTING

(71) Applicant: MakerBot Industries, LLC, Brooklyn, NY (US)

(72) Inventors: Joseph Sadusk, New York, NY (US); Filipp Gelman, Staten Island, NY (US); Andrey V. Patrov, Brooklyn, NY (US)

(73) Assignee: MakerBot Industries, LLC, Brooklyn, NY (US)

(*) Notice: Subject to any disclaimer, the term of this patent is extended or adjusted under 35 U.S.C. 154(b) by 145 days.

(21) Appl. No.: 14/499,464

(22) Filed: Sep. 29, 2014

(65) Prior Publication Data
US 2015/0093588 A1 Apr. 2, 2015

Related U.S. Application Data

(60) Provisional application No. 61/884,118, filed on Sep. 29, 2013, provisional application No. 61/884,125, (Continued)

(51) Int. Cl.
*B29C 67/00* (2006.01)
*B29C 47/00* (2006.01)
(Continued)

(52) U.S. Cl.
CPC ....... *B29C 67/0092* (2013.01); *B29C 47/0002* (2013.01); *B29C 47/802* (2013.01); *B29C 47/822* (2013.01); *B29C 47/92* (2013.01); *B29C 67/0051* (2013.01); *B29C 67/0088* (2013.01); *B23K 1/19* (2013.01); *B23K 20/00* (2013.01); *B29C 2947/926* (2013.01); *B29C 2947/9258* (2013.01); *B29C 2947/92571* (2013.01);
(Continued)

(58) Field of Classification Search
CPC ................. B29C 67/0051; B29C 2947/92571; B29C 2947/9258; B29C 2947/926; B29C 2947/92904; B29C 47/0002; B29C 47/802; B29C 47/822; B29C 47/92; B29C 67/0088; B29C 67/0092; B29L 2009/00; B33Y 80/00; B33Y 10/00; B33Y 50/02; B23K 1/19; B23K 20/00; Y02P 90/265; Y10T 428/31786; Y10T 428/31913
See application file for complete search history.

(56) References Cited

U.S. PATENT DOCUMENTS 7,744,364 B2   6/2010   Turley et al.
2014/0252684 A1   9/2014   Swanson et al.

OTHER PUBLICATIONS

Reprap Wiki, "Java Software Preferences File", http://reprap.org/wiki/Java_Software_Preferences_File Mar. 7, 2013, 13 Pages.
(Continued)

*Primary Examiner* — Robert J Grun
(74) *Attorney, Agent, or Firm* — Strategic Patents, P.C.

(57) ABSTRACT

Multi-material, three-dimensional fabrication is improved by the use of a purge wall adjacent to an object to absorb transitional artifacts of material changes. The structure of the purge wall may be selected to reduce build time, and to reduce certain printing artifacts such as warping and delaminating. For example, alternating layers of offset or mirrored zigzag patterns may be used to reduce and distribute the layer-to-layer adhesion surfaces throughout the purge wall while providing sufficient contact points to maintain the structural integrity of the purge wall.

20 Claims, 6 Drawing Sheets

Related U.S. Application Data filed on Sep. 29, 2013, provisional application No. 61/884,925, filed on Sep. 30, 2013.

(51) Int. Cl.

| | |
|---|---|
| *B29C 47/80* | (2006.01) |
| *B29C 47/82* | (2006.01) |
| *B29C 47/92* | (2006.01) |
| *B33Y 10/00* | (2015.01) |
| *B33Y 50/02* | (2015.01) |
| *B23K 20/00* | (2006.01) |
| *B23K 1/19* | (2006.01) |
| *B33Y 80/00* | (2015.01) |
| *B29L 9/00* | (2006.01) |

(52) U.S. Cl.
CPC .. *B29C 2947/92904* (2013.01); *B29L 2009/00* (2013.01); *B33Y 10/00* (2014.12); *B33Y 50/02* (2014.12); *B33Y 80/00* (2014.12); *Y02P 90/265* (2015.11); *Y10T 428/31786* (2015.04); *Y10T 428/31913* (2015.04)

(56) References Cited

OTHER PUBLICATIONS

Reprap Wiki, "DriverSoftware", http://reprap.org/wiki/DriverSoftware Jul. 7, 2014, 30 pages.

Reprap Wiki, "RepRap Wiki Article", http://reprap.org/wiki/%E5%BD%A9%E8%89%B2%E5%88%87%E7%89%87%E8%BD%AF%E4%BB%B6 Aug. 7, 2013, 11 Pages.

Reprap Wiki, "RepRapPro Slicer Variables", http://reprap.org/wiki/RepRapPro_Slicer_Variables Aug. 7, 2013, 13 Pages.

Hergel, Jean et al., "Clean color: Improving multi-filament 3D prints", Eurographics, vol. 33 (2014), No. 2, 2014, 10 pages.

Hergel, Jean et al., "Clean color: Improving multi-filament 3D prints", Computer Graphics Forum, May 2014, pp. 469-478.

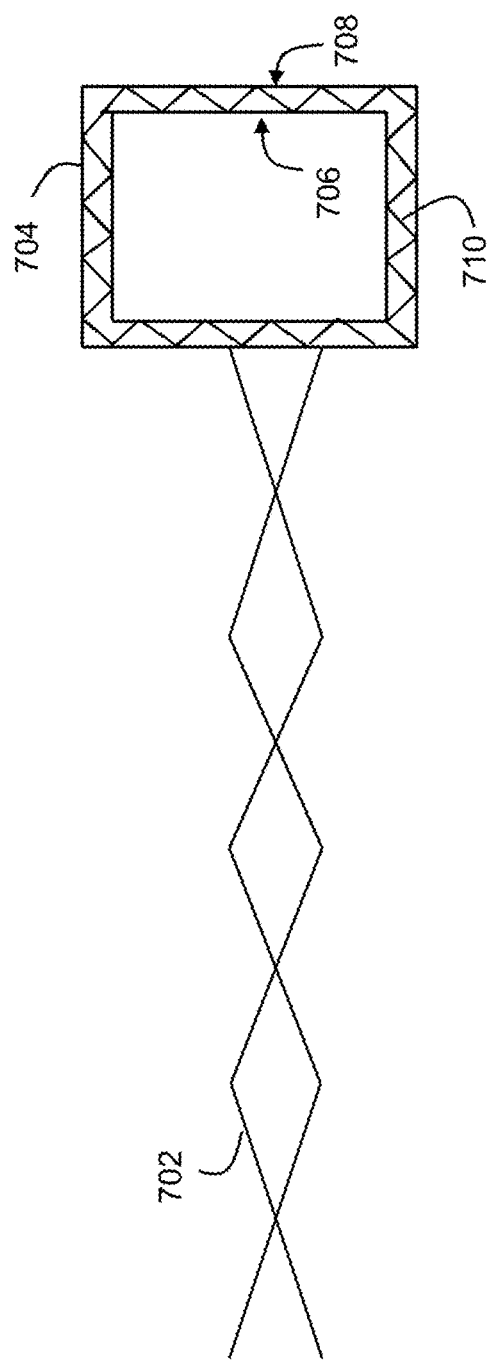

PURGE WALL FOR THREE-DIMENSIONAL PRINTING

RELATED APPLICATIONS

This application claims the benefit of the following provisional applications: U.S. Prov. Appl. No. 61/884,118 filed Sep. 29, 2013; U.S. Prov. Appl. No. 61/884,125 filed Sep. 29, 2013; and U.S. Prov. Appl. No. 61/884,925 filed Sep. 30, 2013, the entire content each of which is hereby incorporated by reference.

BACKGROUND

The invention relates to the use of supplemental structures constructed during fabrication of a three-dimensional object in order to improve transitions between different build materials used in the object.

When three-dimensionally printing an object with multiple build materials, it can be difficult transitioning from one build material to another. For example, materials such as thermoplastics that are heated up for three-dimensional printing do not transition instantaneously from solid to liquid states or vice versa. Thus, leakage can occur as tools are being turned on and off during fabrication. Without special handling, these transitional artifacts can result in structural or visual irregularities in fabricated objects. There remains a need for improved supplemental structures that can be fabricated in a build environment to facilitated transitions between build materials during a three-dimensional print.

SUMMARY

Multi-material, three-dimensional fabrication is improved by the use of a purge wall adjacent to an object to absorb transitional artifacts of material changes. The structure of the purge wall may be selected to reduce build time, and to reduce certain printing artifacts such as warping and delaminating. For example, alternating layers of offset or mirrored zigzag patterns may be used to reduce and distribute the layer-to-layer adhesion surfaces throughout the purge wall while providing sufficient contact points to maintain the structural integrity of the purge wall.

In one aspect, this may include a method comprising three-dimensionally printing an object in a plurality of layers based upon a digital model of the object, the object including two or more different build materials; fabricating a wall outside the object in a second plurality of layers using alternating layers with different paths selected to reduce a shared surface between each adjacent pair of the alternating layers; and transitioning from a first build material of the two or more different build materials to a second build material while fabricating the wall.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the invention.

FIG. 7 shows a purge wall with a purge bucket on one end.

DETAILED DESCRIPTION

Figure 1:
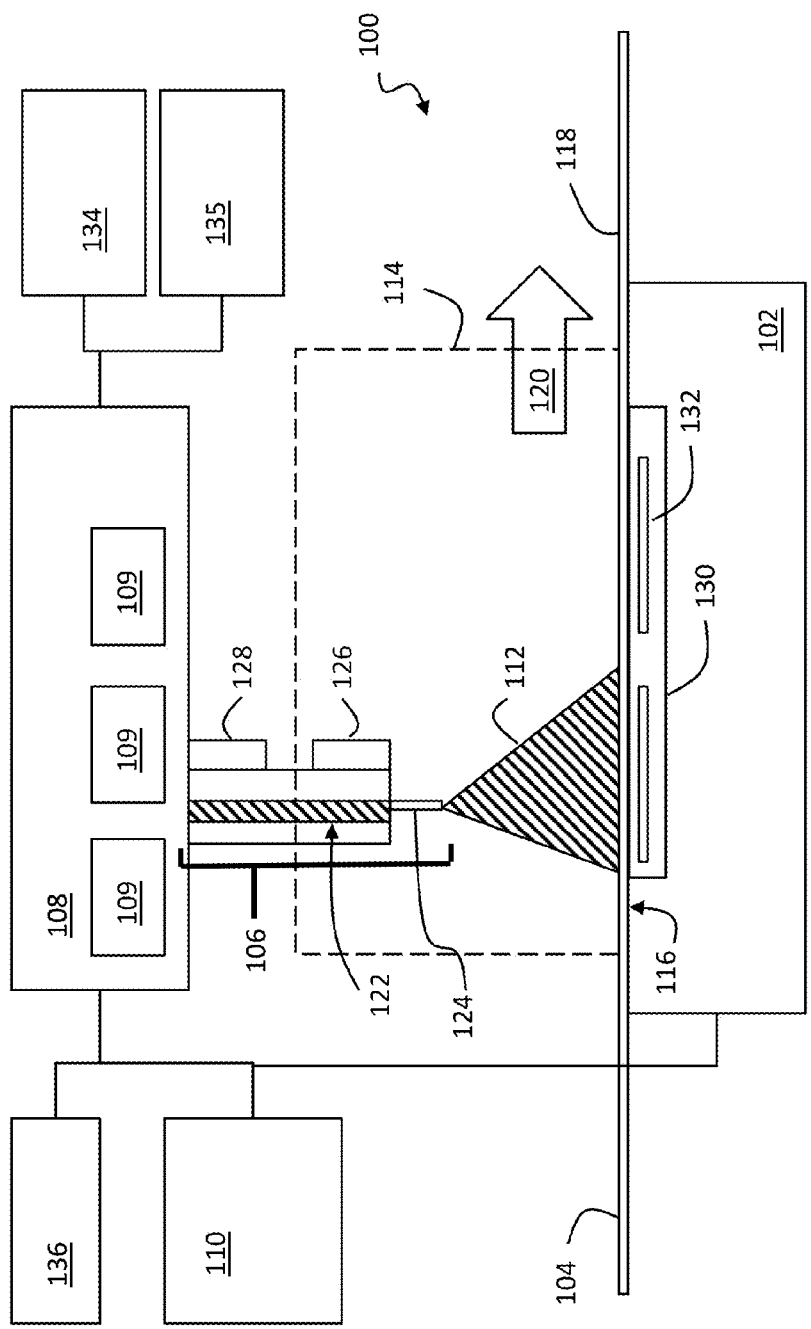
FIG. 1 is a block diagram of a three-dimensional printer.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "above," "below," and the like, are words of convenience and are not to be construed as limiting terms.

Described herein are devices and methods for printing an object and at least one wall using three-dimensional printers. It will be understood that while the exemplary embodiments below emphasize fabrication techniques using extrusion, the principles of the invention may be adapted to a wide variety of three-dimensional fabrication processes, and in particular additive fabrication processes including without limitation selective laser sintering, fused deposition modeling, three-dimensional printing, and the like. All such variations that can be adapted to use with printing a wall during fabrication of an object as described herein are intended to fall within the scope of this disclosure. It should also be understood that any reference herein to a fabrication process such as printing or three-dimensional printing is intended to refer to any and all such additive fabrication process unless a different meaning is explicitly stated or otherwise clear from the context. Thus by way of example and not of limitation, a three-dimensional printer (or simply "printer") is now described that may be used to print an object and at least one wall in a three-dimensional printing environment.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyer may include a motor or other similar drive mechanism (not shown) coupled to the controller 110 to control movement of the sheet 118 of material along the path 120. Various drive mechanisms are shown and described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to seven thousandths of an inch, or any other thickness that permits the sheet 118 to follow the path 120 of the conveyer 104. For example, with sufficiently strong material, the sheet 118 may have a thickness of one to three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyor 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyor 104, the x-y-z positioning assembly 108, and the other various components of the printer 100. In general, the controller 110 is operable to control the components of the printer 100, such as the build platform 102, the conveyor 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyor 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyor 104. This may include an optical detector arranged in a beam-breaking configuration to sense the presence of the object 112 at a location such as an end of the conveyor 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware, or within a web page provided by a web server hosted by the three-dimensional printer 100. Thus in one aspect there is disclosed herein a user interface adapted to present a video feed from at least one video camera of a three-dimensional printer to a remote user through a user interface.

The sensor 134 may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as BlueTooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability. Networked uses of the printer 100 are discussed in greater detail below.

Figure 2:
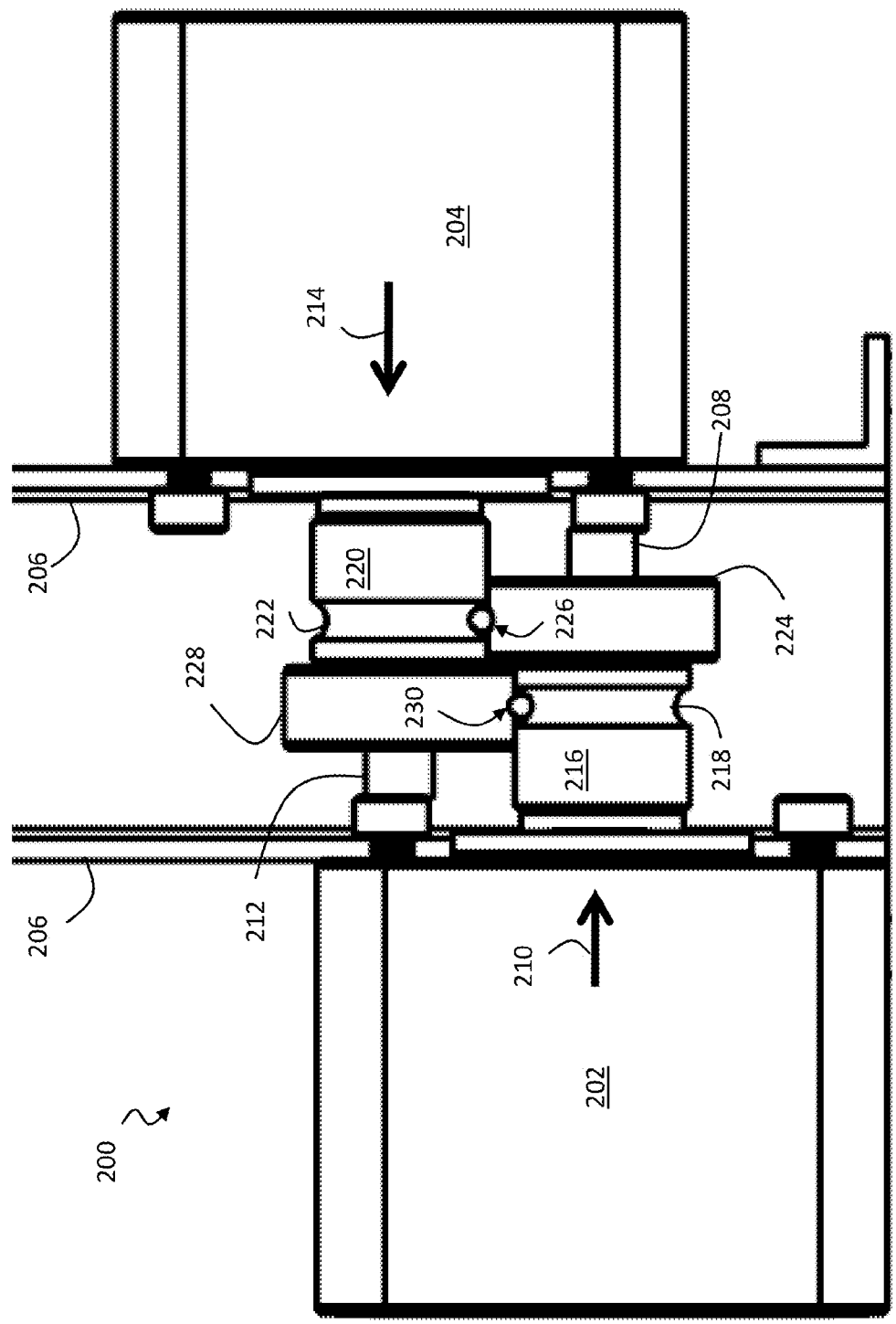
FIG. 2 is a top view of a multi-extruder

FIG. 2 is a top view of a multi-extruder such as the multi-extruder disclosed in U.S. Pat. No. 8,512,024, issued on Aug. 20, 2013 and incorporated by reference herein in its entirety. While multi-extruder 200 shown and described in FIG. 2 may be usefully employed to fabricate with multiple build materials, it will be appreciated that any other design suitable for fabricating with two or more different build materials may also or instead be employed, including tools with multiple extruders integrated into a single tool head and tools with different extruders operating with independent robotics or other components. The emphasis in this disclosure is on the "purge wall" structure fabricated to assist with transitions rather than the implementation details of any particular multi-material system. Thus it will be appreciated that the term multi-extruder as used herein is intended to refer to an entire, integrated multi-material extrusion system, as well as sub-assemblies thereof that are used in a multi-material extrusion process, or any multiple, independent extrusions systems capable of three-dimensional printing within a shared build volume.

The multi-extruder 200 may include a first motor 202 and a second motor 204 secured to two opposing plates 206. Each motor 202, 204 may be a DC stepper motor or any other drive unit suitable for applying adequate force to a filament for extrusion as contemplated herein.

The first motor 202 may have a first axis 208 extending therefrom in a first direction 210. An end of the first axis 208 away from the first motor 202 may be secured, for example, in a bearing secured in the opposing plate 206 from the one that retains the first motor 202. The second motor 204 may similarly include a second axis 212 extending in a second therefrom in a second direction 214, with an end of the second axis 212 secured in the one of the opposing plates 206 that secures the first motor 202.

The second axis 212 of the second motor 204 may be parallel to the first axis 208 of the first motor 202, with the two axes 208, 212 pointing in opposite directions as depicted, and overlapping one another to provide a space therebetween where gears and bearings can be arranged as discussed below.

A first gear 216 may be rigidly coupled to the first axis 208 in a manner such that rotation of the first motor 202 directly translates into rotation of the first axis 208 and the first gear 216. The first gear 216 may include a concave, toothed portion 218 around its perimeter that includes teeth, ribs, or other similar surface treatment capable of gripping a filament of build material under opposing pressure from a bearing. A second gear 220 may be rigidly coupled to the second axis 212 in a manner such that rotation of the second motor 204 directly translates into rotation of the second axis 212 and the second gear 220. The second gear 220 may include a concave, toothed portion 222 around its perimeter that includes teeth, ribs, or other similar surface treatment capable of gripping a filament of build material under opposing pressure from a bearing or the like.

A first bearing 224 may be rotatably coupled to the first axis 208 in a free-wheeling manner at a position axially aligned with (e.g., positioned along the axis at a corresponding position to) the second gear 220 so that a first channel 226 is formed between the first bearing 224 and the second gear 220. Within the first channel 226, the concave, toothed portion 222 of the second gear 220 can grip and propel a filament under power of the second motor 204, with opposing pressure providing by the first bearing 224. Similarly, a second bearing 228 may be rotatably coupled to the second axis 212 in a free-wheeling manner at a position axially aligned with (e.g., positioned along the axis at a corresponding position to) the first gear 216 so that a second channel 230 is formed between the second bearing 228 and the first gear 216. Within the second channel 230, the concave, toothed portion 218 of the first gear 216 can grip and propel a filament under power of the first motor 202, with opposing pressure provided by the second bearing 228.

The first gear 216 and the second gear 220 may be equally proportioned, particularly with respect to radius and the shape/size/depth of the concave, toothed portions 222, 218. This may be particularly useful where filaments of similar or identical diameter are used in each channel 226, 230. Conversely, each of the gears 216, 220 may be differently proportioned, with corresponding adaptations to the shape and size of the opposing bearings 224, 228 and other components. The first motor 202 and/or the second motor 204 may also be equally proportioned, and/or may provide equivalent drive forces. Similarly, the first bearing 224 and the second bearing 228 may be equally proportioned, or may have differing sizes and/or shapes.

In one aspect, the first channel 226 may be offset (within the plane of FIG. 2, or within the plane of a build platform or the like onto which the multi-extruder deposits material) from the second channel 230 by an amount substantially equal to an x and/or y resolution of an x-y-z positioning system, so that each channel can extrude onto the substantially the same location in an object to the extent that the x-y position can be resolved by a printer. In another aspect, the first channel 226 and the second channel 230 may be offset from one another by a fractional amount of the x-y resolution in order to facilitate sub-pixel resolution in a printing process.

The first motor 202 and the second motor 204 may be coupled to a controller such as the controller 110 described above in order to control operation of the two motors 202, 204, which may operate cooperatively or independently according to the desired output from the multi-extruder 200. As noted generally above, the controller 110 may control a build process using two filaments fed to the multi-extruder 200. It will be readily appreciated that any number of other additional motors and/or gears may be arranged to drive one or more additional build materials in an extrusion process as contemplated herein. So for example, three filament feeds may be closely arranged with three axes, each carrying a fixed gear, along with free-wheeling bearings arranged to provide complementary forces for gripping and driving filament. It will similarly be appreciated that two or more of the independently controllable filament drives may share components such as a nozzle, a heating element, an interior chamber, and so forth.

During the printing process, three dimensional printer extruders may emit liquefied filament even when the motor is not turning. This filament emission may be a result of filament that remains in the heated extruder continuing to melt and may drip or ooze from the extruder onto the object or build platform. This may result in inconsistencies in the printed object. The inconsistency may include overlap of different materials or colors on the object, holes in the object, excess material on the object, or other artifacts of the transition from one build material to another. The filament emission may be particularly prevalent with multiple extruders where one extruder may ooze while another extruder is printing. The additional filament emission from an extruder may also collect and harden at a location above the current fabrication height, leaving a protrusion that a print tool might run into, thus dislodging a partially fabricated object from a build platform.

As another difficulty, if one extruder is inactive for a period of time, the extruder may become jammed with hardened material. In multiple extruder printers this may happen when one extruder is inactive while the other one is actively extruding material. In this situation, the inactive extruder may cool, allowing the filament to harden in the inactive extruder. This may prevent the drive motor from driving new material into the inactive extruder when it is time to resume material extrusion.

These and other challenges of multi-material printing may be addressed by fabricating disposable purge walls adjacent to the printed object. These purge walls may be fabricated concurrently with the object and positioned to absorb inconsistencies in the filament material. In one aspect, an L shaped or other shaped purge wall may be fabricated in a position near the object. Depending on the shape, size, number of materials, and number of colors of the object to be printed, one or more purge walls may be printed concurrently with the object. In another aspect, purge walls may be fabricated within the shape of the object. In the case of an interior purge wall, the purge wall may be fabricated in a volume that is not part of the object volume. In an aspect, the location and shape of the purge wall(s) may be determined by the printing path of the positioning assembly. For example, for a multi-extruder printer, the purge wall may be positioned to allow deposit of material on the purge wall(s) with a first extruder while a second extruder is not positioned over the object, and vice versa. In other words, the purge wall may be positioned so that either extruder can deposit material on the purge wall while the other extruder is outside a projection of the object at that height.

These purge walls may ensure that print-quality defects occur on the disposable or sacrificial purge wall(s) (or alternatively, on non-exterior walls within the model, where interior purge walls are available) instead of on the surface of the fabricated object or at other structurally or aesthetically important locations within the model. The purge wall layer may usefully be created for each layer of fabrication, and for each material at that layer height, and may advantageously be created prior to object fabrication at that layer height.

Figure 3:
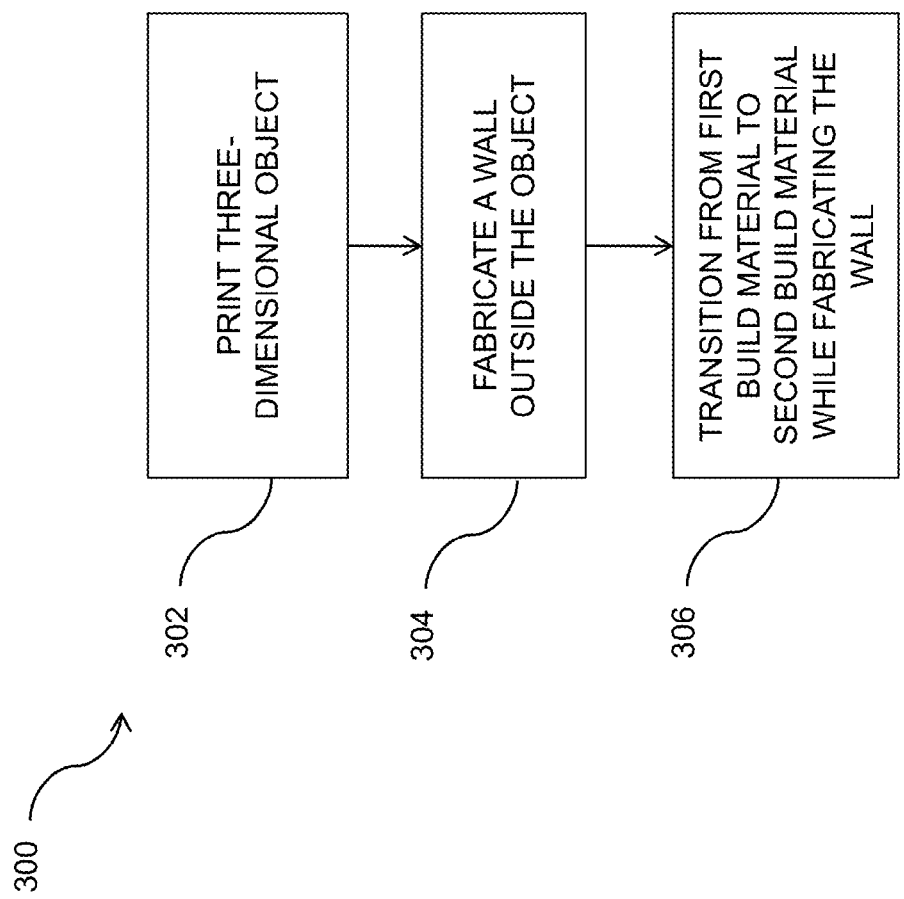
FIG. 3 is a flowchart of a method for three-dimensionally printing an object and a purge wall.

FIG. 3 is a flowchart of a method for three-dimensional printing of an object and at least one purge wall.

As shown in step 302, the method 300 may begin with three-dimensionally printing an object. The object may include a first plurality of layers based upon a digital model of the object such as a stereolithography (STL) file or the like. The object may be fabricated of layers using two or more different build materials such as different colored build materials, different types of materials as described above, or materials with other aesthetic, structural, or functional differences.

As shown in step 304, the method may include fabricating a wall such as a purge wall outside of the object using a second plurality of layers. In general, a layer of this supplemental wall at a particular fabrication height may be built at the same time as a corresponding layer of the object, although it will appreciated that this may be before, after, or during fabrication of the object layer. That is, a layer of the wall may be deposited before the corresponding layer of the object, after the corresponding layer of the object, or during fabrication of the object, such as during a material transition within the object. In this context, terms such as "concurrent" or "at the same time" may be used to describe fabrication of both the wall and the object at a particular processing height, even though these two fabrication steps are in fact discrete, and generally occur sequentially with a dual-extrusion printer or the like.

The wall(s) may be fabricated in a manner that facilitates quick and stable printing. For example, the surface-to-surface contact may be reduced toward a minimum needed to retain a structure of the wall, thus decreasing fabrication time. Similarly, by avoiding large overlapping areas from layer to layer in the wall, the tendency to induce warping and/or delaminating from a build platform can be reduced. Thus, the pattern for the wall may use alternating layers with different paths selected to reduce a shared surface between each adjacent pair of the alternating layers. Suitable patterns include, for example, varying zigzag patterns, such as a zigzag pattern and a mirror image zigzag pattern that intersects an underlying layer at or near a midpoint of each straight line segment. As another example, offset zigzag patterns may be used. A large angle such as an angle of at least one hundred twenty degrees may be used between contiguous straight line segments of the zigzag in order to span distances around the object more quickly. However other angles may also or instead be used without departing from the scope of this invention. Similarly, other irregular patterns, curved patterns or the like may be employed in a criss crossing or other pattern that reduces layer-to-layer contact. For example, the layer-to-layer contact may provide a shared surface of less than ten percent of a total surface between a first layer path and a second layer path. In other words, if a path of a first layer creates a surface of ten square millimeters, the projected surface area contacting an adjacent second layer may usefully be maintained below on square millimeter. While ten percent is a useful limit on shared surface area, it will be understood that greater overlapping surface are may be used without departing from the scope of this disclosure, and the overlap may, for example, be at least twenty percent, at least thirty percent, at least fifty percent, or more. It will also be appreciated that materials such as thermoplastics may tend to sag in the absence of support and as such, material from one layer that is unsupported may droop and contact a layer below the immediately preceding layer. This type of contact with layers before the immediately preceding layer, or after the immediately subsequent layer, is not intended to fall within the ten percent limit described above, and these loosely contacting layers are not typically fused as strongly as immediately adjacent layers.

More generally any pattern or combination of patterns may be used to fabricate a wall as contemplated herein provided that it tends to (a) reduce layer-to-layer contact in order to mitigate the effects of thermally induced stress within the wall, and (b) provide a simple pattern amenable to rapid fabrication in order to mitigate affect on build time for an object.

In one aspect, different layer paths for alternating layers may be selected so that the layer paths overlap one another exclusively in non-parallel segments—e.g., in a crisscrossing pattern or the like—over at least some portion of the wall. In another aspect, the pattern of a first layer may be different than the pattern of a second layer. As non-limiting examples, the first layer may be a zigzag pattern and a second layer may be a circular pattern or a first layer may be a square wave pattern and a second pattern may be straight pattern across the first square wave pattern.

In an example of a zigzag pattern, a first layer may have a pattern that starts by zigging to the right and then zagging to the left, this right/left pattern may continue for the first layer. A second adjacent layer may have a pattern that starts by zigging to the left and then zagging to the right, this left/right pattern may continue for the second layer. These different zigzag patterns may be alternated one on top of the other for the determined height of the purge wall. By alternating this type of pattern, a small shared surface is provided between the layers. The alternating pattern may be any type of shape including, by way of example, various angles, curves, circles, or the like that allows for a reduce shared surface between the layers.

In an aspect, a bottom layer of the purge wall may have a different shape from the different paths of the alternating layers. For example, the bottom first layer may provide a raft or similar structure with a pattern that provides stability for the purge wall fabricated above it, and/or provides a bottom layer that promotes good adhesion to a build platform. The bottom layer may be a square wave pattern that provides tipping and warping resistance for the purge wall. Alternating patterns, as described above, may be fabricated on top of this bottom square wave layer. While the alternating patterns described above are easily implemented, it will be understood that other sequences of patterns may be used that do not alternate or repeat in any manner, or that change over a larger number of possible patterns, and all such combinations that reduce shared surface between adjacent layers as described above may be usefully employed with a purge wall or the like as contemplated herein.

The wall may usefully take a variety of shapes around or within the object. For example, the wall may form an L shape around a portion of the object, which conveniently provides stability in the x and y directions with a minimum of time and build material. The purge wall may also or instead surround and enclose the object, either loosely as with a large circle or square around a projection of the object, or tightly, such as with a contour fitted to an outset (e.g., outer perimeter of a projection of the object in the x-y plane) of the object. This latter embodiment usefully minimizes the excursions needed during purge operations.

A purge bucket may also or instead be used. In general, the purge bucket provides a closed-wall structure that can catch extra material extruded from a tool. When clearing or purging a nozzle of an extruder, the nozzle may be positioned over an interior of the closed-wall structure and material may be extruded for a predetermined time. This purge bucket may be fabricated as a stand-alone structure, or in combination with the wall, such as by fabricating the purge bucket on an end of the wall to capture the excess extrudate. The bucket may vary in size according to an expected frequency of purging, or an expected amount of material per purge, or some combination of these.

As shown in step 306, the method 300 may include transitioning from a first build material of the two or more different build materials to a second build material. It will be understood that transitioning as described in step 306 may also include fabricating the wall as described in step 304, such as where material purged from an extruder is used in whole or in part to build a portion of the wall. In general, transitioning between build materials may include a variety of different steps, which may occur before, after, or during fabrication of the wall. For example, transitioning may include purging material from an extruder after use, or extruding material before use to clear out any air, burnt or hardened build material, and so forth. In either case, a nozzle may be usefully wiped on an edge such as the edge provided by the wall to provide a clean and predictable starting point for subsequent deposition.

As described above, in using a multi-extruder, using more than one build material may result in excess material in an inactive extruder that may drip or ooze material onto the object. Using the fabrication of purge walls provides a location within the build volume to transition from one material to a second material without affecting the fabrication of the object. In an aspect, transitioning may include purging an extruder nozzle of the first build material. Purging the nozzle may prevent oozing of material onto the object. In another aspect, transitioning may include initiating a use of the second build material by printing a portion of the second build material on the purge wall. Initiating the second material on the purge wall may allow the nozzle to fill with the second build material and may prevent missing second build material on the object that may cause a hole. In another aspect, transitioning may include replacing the first build material with the second build material in a nozzle. Replacing the first build material with the second build material on the purge wall may allow the nozzle to fill with the second build material and may prevent missing material on the object that may cause a hole. In another aspect, transitioning may include moving a nozzle of a three-dimensional printer containing the first build material across the wall to capture leakage of the first build material from the nozzle.

Figure 4:
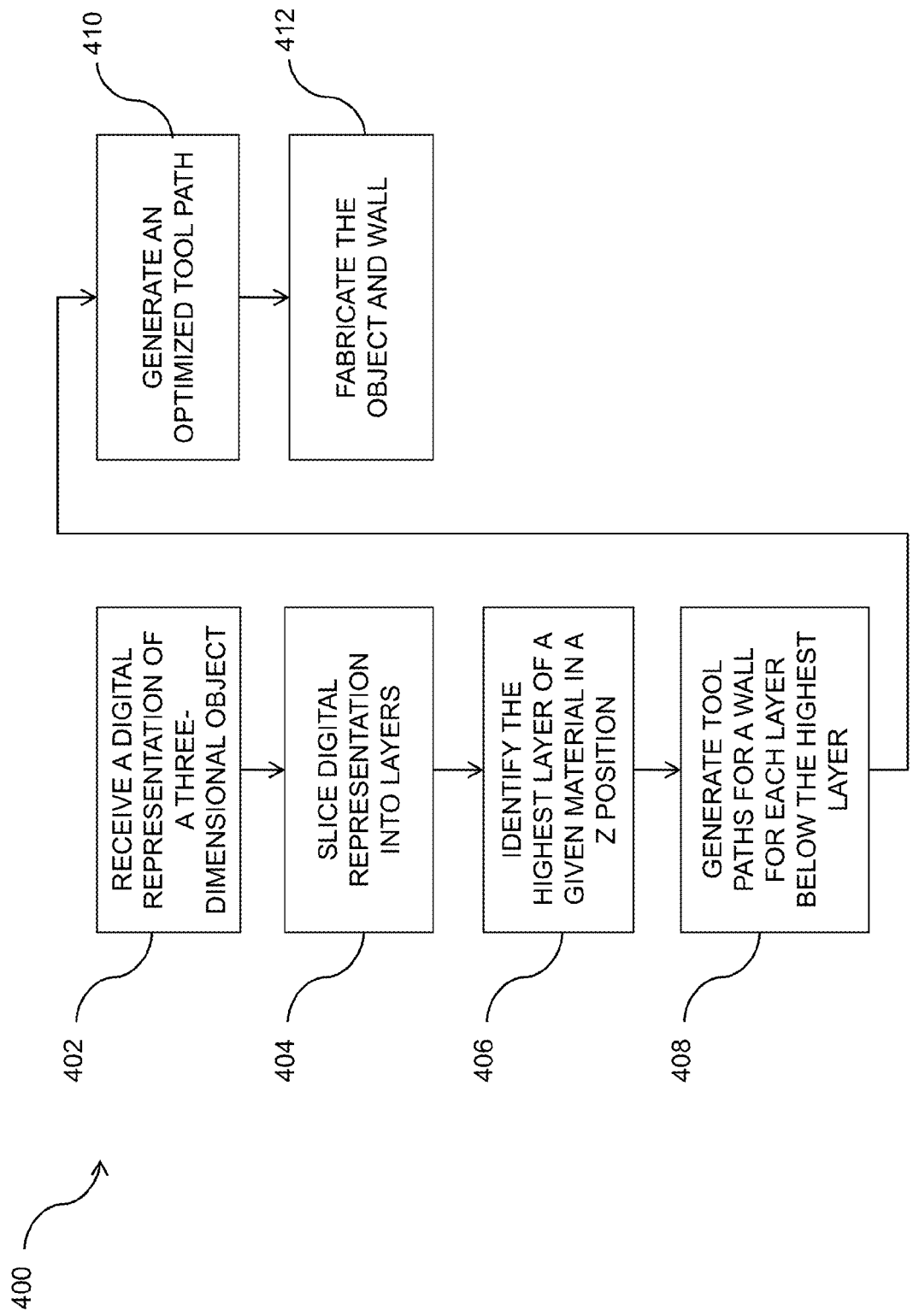
FIG. 4 is a flowchart of a method for the determination of a purge wall layer tool path.

FIG. 4 is a flowchart of a method for the determination of a purge wall layer tool path. The process 400 may begin with step 402 where a slicing engine—a software module for creating a tool path—receives a digital representation of a three-dimensional object. The slicing engine may employ various layering determination strategies, including but not limited to a receiving strategy, a parsing strategy, a grouping strategy, an outline strategy, a processing strategy, a classification strategy, an optimization strategy, and a conversion strategy that may be used for the determination of layers within the object and purge wall.

The method 400 continues with step 404 with the slicing engine slicing the digital representation of the object and purge wall into layers. In an aspect, the purge wall configuration may be determined while the object slices are determined by the slicing engine.

The method 400 may continue with step 406 where the slicing engine identifies the highest layer of a given build material of the object for the determination of the highest layer and corresponding z position.

The method 400 may continue with step 408 where tool paths are generated for purge walls for each layer of the object below the highest layer identified in step 406. The tool path for each layer of the purge wall may be one of the layer patterns as described above. In one aspect, as described above, the tool path for the bottom layer of the purge wall may be optimized to reduce warping of the purge wall and increase adherence to the work surface.

The method 400 may continue with step 410 where the tool path for the bottom layer and the layers up to the highest layer of the purge wall are optimized to reduce warping and increase adherence of the purge wall. This may be done to reduce the risk of the purge wall warping enough to detach, which may result in interference with the extruder and a reduction in build quality, or in particularly troublesome cases, complete loss of a fabricated object. In one aspect, the bottom layer may be a square wave pattern. The size of the wave may be wider than the thickness of the filament so as to provide an adequately sized gap to receive excess material. In other embodiments, a saw tooth layer, a fat layer or other layers may be used.

The method 400 may continue with step 412 where tool path of the object and purge wall are completed and the object and purge wall may be fabricated with a suitable printer according to the determined tool paths.

Figure 5:
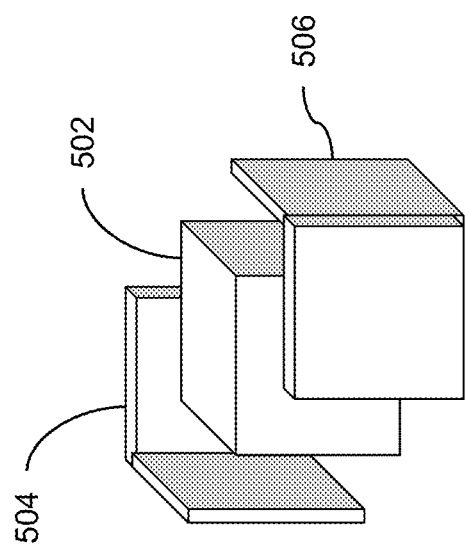
FIG. 5 is a perspective view of a three-dimensional printed object and purge walls.

FIG. 5 is a perspective view of a three-dimensional printed object and purge walls. In this view, an object 502 is shown with two L-shaped purge walls 504, 506. As described above, the purge wall may be any shape such as an L shape around a portion of the object, the purge wall may surround and enclose the object, the purge wall may have a contour fitted to an outset of the object, and/or the purge wall may be positioned within the object. As described in method 400 step 404, the purge wall configuration may be determined while the object slices are determined by the slicing engine. The purge wall may be fabricated outside the bounds of the object, where the purge wall may include a plurality of layers using alternating layers with different paths selected to reduce a shared surface between each adjacent pair of the alternating layers. The purge wall may capture at least one transition from a first build material of two or more different build materials to a second build material. In an aspect, transitioning may include purging an extruder nozzle of the first build material. Purging the nozzle may prevent oozing of material onto the object. In another aspect, transitioning may include initiating a use of the second build material by printing a portion of the second build material on the purge wall. Initiating the second material on the purge wall may allow the nozzle to fill with the second build material and may prevent missing second build material on the object that may cause a hole. In another aspect, transitioning may include replacing the first build material with the second build material in a nozzle. Replacing the first build material with the second build material on the purge wall may allow the nozzle to fill with the second build material and may prevent missing material on the object that may cause a hole. In another aspect, transitioning may include moving a nozzle of a three-dimensional printer containing the first build material across the wall to capture leakage of the first build material from the nozzle.

Figure 6:
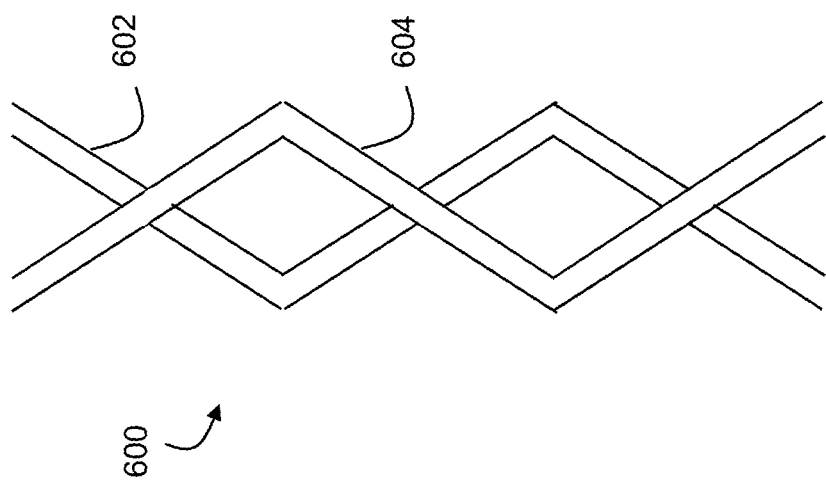
FIG. 6 shows overlapping layers of a purge wall.

FIG. 6 shows overlapping layers of a purge wall. By way of example, FIG. 6 shows a mirrored zigzag pattern, although it will be understood that numerous other useful patterns are described above, and may be used to fabricate purge walls as contemplated herein. In general, the pattern 600 illustrates a first layer 602 having a first zigzag pattern, and a second layer 604 fabricated above the first layer 602 that uses a mirror of the first zigzag pattern. This alternation of patterns may be repeated or varied as layers of a purge wall are fabricated along with an object. The purge wall may be usefully fabricated with this single, alternating line of material, and no further shells, supports, or other structures are generally required, except perhaps for an L or other macro-structure that supports the wall in the x-y plane.

FIG. 7 shows a purge wall with a purge bucket on one end. In general, a wall 702 may use any of the overlapping or zigzagging patterns described above. A purge bucket 704 may be fabricated on an end of the wall 702 or at some other useful location to receive purged build material. While the wall 702 may be fabricated from a single layer of build material, the purge bucket 704 may usefully employ conventional three-dimensional printing constructs such as an inner wall 706, an outer wall 708, and an infill 710, for example if greater structural integrity or stability is desired.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
three-dimensionally printing an object in a plurality of layers based upon a digital model of the object, the object including two or more different build materials;
fabricating a wall outside the object in a second plurality of layers using alternating layers with different paths selected to reduce a shared surface between each adjacent pair of the alternating layers; and
transitioning from a first build material of the two or more different build materials to a second build material while fabricating the wall.

2. The method of claim 1 wherein the two or more different build materials include different colored build materials.

3. The method of claim 1 wherein transitioning includes purging a nozzle of a three-dimensional printer of the first build material.

4. The method of claim 1 wherein transitioning includes initiating a use of the second build material by printing a portion of the wall.

5. The method of claim 1 wherein transitioning includes replacing the first build material with the second build material in a nozzle of a three-dimensional printer.

6. The method of claim 1 wherein transitioning includes moving a nozzle of a three-dimensional printer containing the first build material across the wall to capture leakage of the first build material from the nozzle.

7. The method of claim 1 wherein the different paths have a shared surface of less than ten percent of a total surface of a first one of the different paths.

8. The method of claim 1 wherein at least a portion of the different paths overlap one another exclusively in non-parallel segments.

9. The method of claim 1 wherein the wall forms an L around a portion of the object.

10. The method of claim 1 wherein the wall surrounds and encloses the object.

11. The method of claim 1 wherein the wall has a contour fitted to an outset of the object.

12. The method of claim 1 wherein the alternating layers are formed of offset zigzag patterns.

13. The method of claim 1 wherein the alternating layers are formed of mirror image zigzag patterns.

14. The method of claim 1 wherein the alternating layers are formed of varying zigzag patterns having an angle between segments of at least one hundred twenty degrees.

15. The method of claim 1 wherein the wall further includes a bucket on one end thereof, the bucket sized to capture excess extrudate from an extruder used to three-dimensionally print the object.

16. The method of claim 1 wherein a bottom layer of the wall has a different shape from both of the different paths of the alternating layers.

17. A computer program product comprising non-transitory computer executable code embodied in a non-transitory computer readable medium that, when executing on one or more computers, performs the steps of:
three-dimensionally printing an object in a plurality of layers based upon a digital model of the object, the object including two or more different build materials;
fabricating a wall outside the object in a second plurality of layers using alternating layers with different paths selected to reduce a shared surface between each adjacent pair of the alternating layers; and
transitioning from a first build material of the two or more different build materials to a second build material while fabricating the wall.

18. The computer program product of claim 17 wherein the two or more different build materials include different colored build materials.

19. The computer program product of claim 17 wherein transitioning includes moving a nozzle of a three-dimensional printer containing the first build material across the wall to capture leakage of the first build material from the nozzle.

20. A structure fabricated with a three-dimensional printer, the structure comprising:
an object including a plurality of layers fabricated from a digital model of the object, the object including two or more different build materials; and
a wall outside the object, the wall including a second plurality of layers using alternating layers with different paths selected to reduce a shared surface between each adjacent pair of the alternating layers, the wall capturing at least one transition from a first build material of the two or more different build materials to a second build material.

* * * * *